Patented Nov. 11, 1930

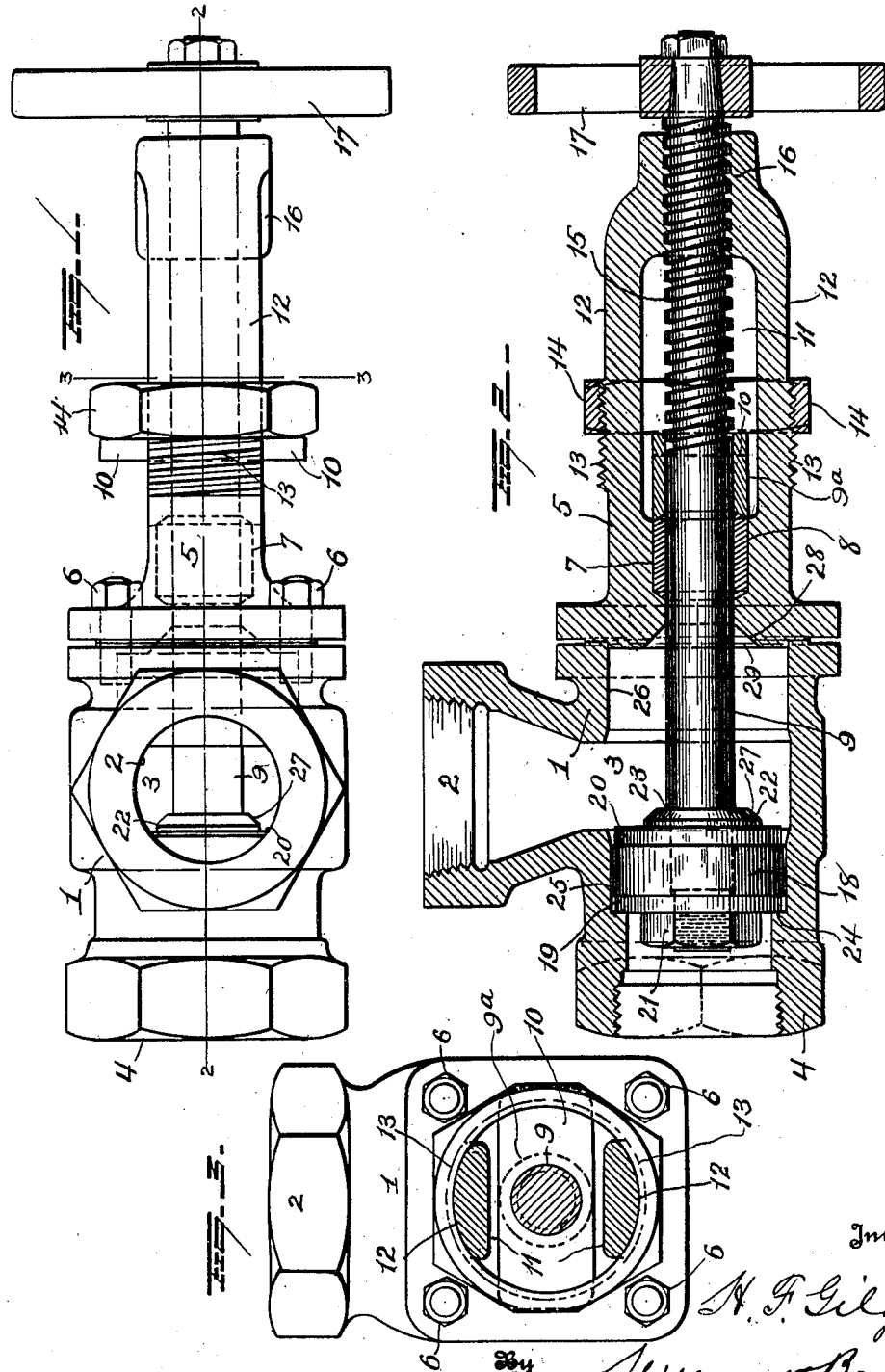

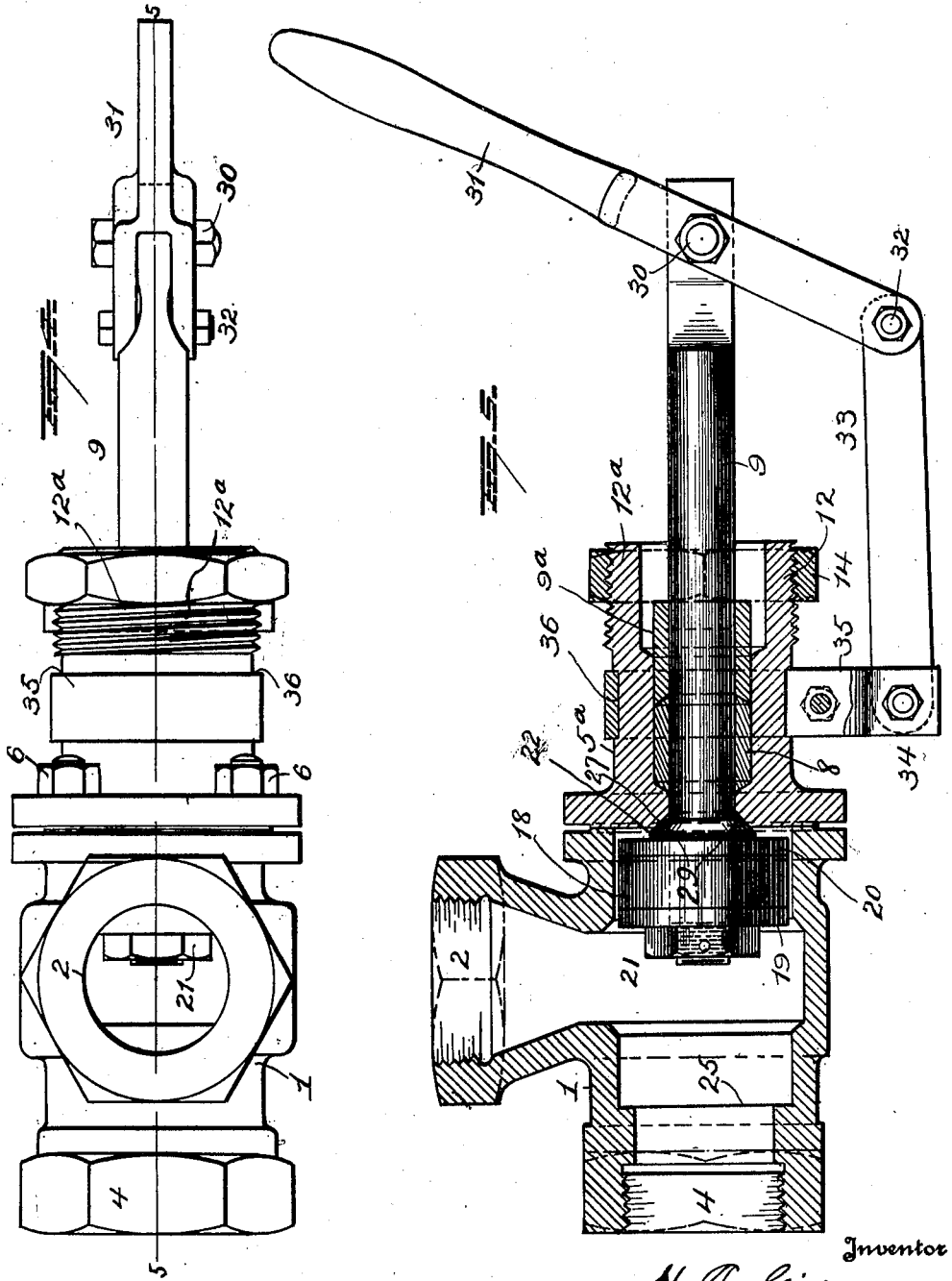

1,781,224

UNITED STATES PATENT OFFICE

HENRY F. GILG, OF PITTSBURGH, PENNSYLVANIA

VALVE

Application filed February 2, 1929. Serial No. 336,997.

This invention relates to improvements in valves, and more especially to piston valves for use in steam, gas, air, water, oil lines and the like.

The primary object of the invention is to furnish a valve for such purposes, in which the head or piston will be expanded by the pressure of the fluid in the line, to maintain a tight seal.

Another object is to furnish a piston-type valve having a slidable stem and a novel packing gland cooperable with the stem, and capable of operation from the exterior of the valve casing.

A further object is to provide a valve piston having a compression washer, and a projecting abutment for the same, designed to enter a recess in the valve bonnet, in order to take care of the abutment when the valve is opened fully.

A still further object is to furnish a valve of this character, in which the casing bore is of two different diameters, the larger diameter portion being adapted to receive the valve head when the latter is in open position, and the valve head and casing having cooperating abutment surfaces to reduce the pressure area on the valve head when the latter is open. Due to this construction, the pressure fluid will act to hold the valve open, as well as closed, and will assist in packing the stem when the valve is opened.

With the foregoing objects outlined and with other objects in view which will appear as the description proceeds, my invention consists in the novel features hereinafter described in detail, illustrated in the accompanying drawings, and more particularly pointed out in the appended claims.

Referring to the drawings,

Fig. 1 is an elevation of one form of my improved valve.

Fig. 2 is a longitudinal sectional view of the same, taken on line 2—2 of Fig. 1.

Fig. 3 is a transverse sectional view, taken on line 3—3 of Fig. 1.

Fig. 4 is an elevation of a modified form of valve.

Fig. 5 is a longitudinal sectional view of the same, taken on line 5—5 of Fig. 4, and with the operating handle attached.

In the embodiment of the invention shown in Figs. 1 to 3 inclusive, 1 designates the valve casing having a threaded inlet 2, leading into the medial portion of the bore 3 of the casing; and 4 designates a threaded outlet preferably disposed at one end of the casing.

A yoke or casing end 5 is fixed to the opposite end of the casing by any suitable means, such as bolts 6, and this yoke has an annular recess 7 in which a packing ring 8 is positioned to prevent any leakage of pressure fluid along the valve stem 9, which will be described later.

Compression is applied to the packing, by means of a gland sleeve 9ª, which has oppositely extending arms 10 that slide in oppositely disposed slots 11, arranged between the arms 12 of the yoke. Each yoke arm is threaded as shown at 13, and these threads cooperate with a nut 14 that bears against the gland-arms 10, for the purpose of gland adjustment. Obviously, when the nut 14 is turned to move the gland toward the casing 1, the packing 8 will be further compressed.

In this form of the invention, the outer end portion of the stem 9 has a screw thread 15, engaging a stationary nut 16, carried by the extremities of the yoke arms, and the outer extremity of the stem is provided with a fixed wheel 17, which permits the operator to turn the stem for the purpose of shifting the valve head within the bore of the casing.

Referring to the valve head, it will be noted from Fig. 2 that this consists of an expansible packing ring 18, rigid compression washers 19 and 20, a nut 21, and a rigid abutment member or washer 22. The parts 18, 20 and 22 may slide along the stem, and the stem has a shoulder 23 against which the abutment 22 impinges to limit the movement of the head in one direction. This abutment is of somewhat less diameter than the washer 20, and functions to reinforce the latter and prevent the same from buckling, while the nut 21, in addition to acting as adjusting means for the head, also serves to reinforce the washer 19, and prevent the latter from buckling.

In the closed position of the valve, washer 19 abuts against an annular seat 24, and may be held in tight engagement with said seat, either by the stem 9 by the pressure fluid within the bore 3 or both by the stem and pressure fluid; for said pressure fluid, in acting against the exposed faces of the washers 20 and 22, forces the latter toward the washer 19, and this causes the packing ring 18 to expand and engage the annular surface 25 of the bore, so as to effectively seal the joint against leakage.

The bore 3 is of larger diameter than the valve head or piston, so that there will be no friction between the casing and the moving member, except such as cannot be avoided between the stem 9 and the bonnet or yoke 5.

The end portion 26 of the bore which receives the head when the valve is opened, is of larger diameter than the part 25 of the bore, and this permits the valve head to be readily moved to open position, as it allows the gas or liquid to pass the piston when the piston is moved to open the valve. Instead of making the bore larger at 26 it may be provided with lengthwise flutes. In order that the pressure may be greater on the front face of the head than on its rear face, when the valve is in open position, the abutment washer 22 has a frusto-conical face 27 that engages a similar face 28 in the inner end of the casing or bonnet 5, and in this way, a part of the abutment member is housed within the recess 29, and the pressure area on the rear face of the valve head is materially reduced. Consequently, when the valve head is in open position, the pressure will force the washer 19 toward the washer 20, and the latter will force the abutment member 22 tighter into the recess 28, with the result that the valve will be held in open position by the pressure fluid, and the force of the pressure fluid will be utilized to prevent leakage along the valve stem.

In the modification shown in Figs. 4 and 5 inclusive, the valve casing, piston head, and inner end of the yoke, is the same in construction, as shown in Figs. 1 to 3 inclusive, but in this modification, the yoke arms 12<sup>a</sup> are separated at their outer ends, and the surface of the valve stem may be smooth throughout its length, that is, it is not provided with screw threads.

For the purpose of shifting this stem without turning the same, its outer end is pivotally connected at 30, to the medial portion of an operating lever 31 that is pivotally connected at 32 to a link 33, which is fastened at 34 to a clamping collar 35, that fits in an annular recess 36 on the cylindrical portion of the yoke 5<sup>a</sup>.

The piston head of this modification will be held in either the open or closed position by the pressure fluid, but in addition, if it is desired, the lever 31 might be held in any desired position, by any suitable means, (not shown).

This invention provides a plug or piston between the inlet and outlet which will be expanded by the pressure of the fluid in the valve casing. In case the valve is used in a gasoline line, the closing pressure may be furnished by the handle, whether wheel 17 or lever 31.

From the above description, it is believed that the construction, operation and advantages of the invention may readily be understood, and it is apparent that changes may be made in the details disclosed, without departing from the spirit of the invention, as expressed in the claims.

Having fully described my invention what I claim as new and desire to secure by Letters-Patent, is:—

1. In a piston type valve, a casing having an inlet and an outlet, and a valve seat arranged between the same, and a valve head arranged in the casing and including first and second compression members and an intermediate expansible packing ring, the first one of said compression members being engageable with said seat, and the other compression member being freely movable toward the first compression member and adapted under fluid pressure exerted in the casing, to move toward the first compression member when the latter is in engagement with its seat and to expand the packing ring into engagement with the bore of the casing.

2. In a piston type valve, a casing having an inlet, an outlet, a bore, and a valve seat in the bore between the inlet and the outlet, a valve stem extending into the bore, and a valve head mounted on the stem and including compression members and an expansible packing ring arranged between the same, one of said compression members being engageable with the seat, and the other being slidable on the stem and adapted under fluid pressure within the bore, to move toward the seat engaging member when the latter is in engagement with its seat, and to thereby expand the packing ring radially into snug engagement with the bore of the casing.

3. In a valve, a casing having an inlet, outlet, a bore, and a valve seat in the bore between the inlet and outlet, a shiftable valve stem projecting into the casing, a valve head arranged in the bore and including a plurality of shiftable compression members, and an expansible packing ring arranged between the same, said members and packing ring being normally of slightly less diameter than the bore, one of said compression members being engageable with said seat, and the other compression member being adapted to move toward the same under fluid pressure exerted in the casing when the first named compression member is in engagement with its seat, for expanding the packing ring radially into snug engagement with the bore.

4. A piston type valve including a casing having an inlet, an outlet, a bore, and a valve seat in the bore between the inlet and outlet, a shiftable valve stem extending into the casing, and a valve head mounted on the stem, said valve head including a plurality of shiftable compression members, an expansible packing ring arranged between said members, an abutment washer bearing against one of the shiftable compression members, and an adjusting member bearing against the other one of the compression members, the adjusting member and the abutment washer functioning to prevent buckling of the compression members, one of said compression members being engageable with the seat, and the other compression member being adapted under fluid pressure in the casing when the seat engaging member is seated, to expand the packing ring radially into snug engagement with the bore.

5. A piston type valve including a casing having an inlet, an outlet, a bore, and a seat in the bore between the inlet and the outlet, a shiftable valve stem extending into the casing, and a valve head mounted on the stem and adapted to cooperate with the seat and bore for preventing pressure fluid travelling from the inlet to the outlet, said head including a first compression washer engageable with the seat, and a shiftable compression washer slidably mounted on the stem, a packing ring located between said washers and adapted under fluid pressure exerted on the shiftable washer, to expand into snug engagement with the bore when the first compression member is seated, a shiftable abutment washer engageable with the shiftable compression washer, and an adjustment member engaging the first compression washer.

6. A piston type valve including a casing having an inlet, an outlet, a bore, and a valve seat in the bore between the inlet and the outlet, the portion of the bore between the inlet and the valve seat being of less diameter than another portion of the bore, a casing end connected to the casing and having an opening therein arranged adjacent to the larger diametered portion of the bore, a shiftable stem extending through said opening, and an expansible piston head mounted on the stem and engageable with the valve seat and said portion of the bore of less diameter and adapted to occupy the larger portion of the bore when the valve is in open position, the casing end being provided with an annular recess adjacent to said opening, and the valve head having a projecting abutment, adapted to extend into said recess when the valve is open.

7. In a piston type valve a casing having an inlet and an outlet, and a valve seat arranged between the same, a valve head arranged in the casing and including a compression member and an expansible packing ring, and means for exerting pressure on the compression member for causing the ring to expand radially to cut off communication between the inlet and outlet, the compression member being freely movable normally relatively to said last mentioned means.

In testimony whereof, I have signed this specification.

HENRY F. GILG.